(12) United States Patent
Cross

(10) Patent No.: US 6,626,788 B2
(45) Date of Patent: Sep. 30, 2003

(54) GEAR DRIVE SYSTEM HAVING SLIP-IN SPACER AND METHOD OF USE

(75) Inventor: John W. Cross, Collegeville, PA (US)

(73) Assignee: ASI Technologies, Inc, Horsham, PA (US)

( * ) Notice: Subject to any disclaimer, the term of this patent is extended or adjusted under 35 U.S.C. 154(b) by 0 days.

(21) Appl. No.: 09/916,623

(22) Filed: Jul. 27, 2001

(65) Prior Publication Data

US 2002/0068657 A1 Jun. 6, 2002

Related U.S. Application Data

(60) Provisional application No. 60/221,449, filed on Jul. 28, 2000.

(51) Int. Cl.⁷ .............................................. F16H 48/06
(52) U.S. Cl. .................... 475/230; 74/606 R; 74/607; 475/231
(58) Field of Search ............... 74/606 R, 607; 475/230, 231, 220, 248

(56) References Cited

U.S. PATENT DOCUMENTS

| 3,115,790 A | * | 12/1963 | Cornish et al. ............. 335/124 |
| 3,421,390 A | | 1/1969 | Lohr |
| 3,628,399 A | * | 12/1971 | Seitz et al. ................. 475/230 |
| 4,733,578 A | | 3/1988 | Glaze et al. |
| 4,751,853 A | * | 6/1988 | Dissett ....................... 475/160 |
| 4,885,958 A | | 12/1989 | Stritzel |
| 5,131,894 A | | 7/1992 | Hilker |
| 5,221,238 A | | 6/1993 | Bawks et al. |
| 5,492,510 A | | 2/1996 | Bowerman |
| 5,509,864 A | | 4/1996 | Hauser |
| 5,624,345 A | * | 4/1997 | Graft et al. ................. 384/563 |
| 5,839,327 A | * | 11/1998 | Gage ......................... 184/11.1 |
| 5,863,271 A | | 1/1999 | Schreier et al. |
| 5,951,431 A | | 9/1999 | Downs et al. |
| 5,980,416 A | * | 11/1999 | Gafvert ....................... 475/230 |
| 5,984,823 A | | 11/1999 | Gage |
| 6,014,916 A | | 1/2000 | Tyson |
| 6,053,838 A | * | 4/2000 | Gage ........................... 475/248 |
| 6,146,304 A | * | 11/2000 | Bendtsen ..................... 475/230 |
| 6,176,152 B1 | | 1/2001 | Victoria et al. |
| 6,210,299 B1 | * | 4/2001 | Yoshioka ..................... 475/230 |
| 6,254,505 B1 | | 7/2001 | Forrest |
| 6,290,623 B1 | * | 9/2001 | Morse ......................... 475/231 |
| 6,318,201 B1 | * | 11/2001 | Yoshioka ..................... 384/563 |
| 6,409,626 B1 | * | 6/2002 | Irwin .......................... 384/583 |

* cited by examiner

Primary Examiner—Rodney H. Bonck
Assistant Examiner—David D. Le
(74) Attorney, Agent, or Firm—Akin, Gump, Strauss, Hauer & Feld, L.L.P.

(57) ABSTRACT

A gear drive system including a housing having a cavity and first and second opposed, axially aligned output shafts, the first and second output shafts having first and second gears, respectively, mounted thereon. At least one of the first and second output shafts has a predefined range of travel in the longitudinal direction of the first and second output shafts. A gear assembly is in operative engagement with the first and second gears. A spacer is positioned between the housing and one of the first and second gears. The spacer is configured to preclude movement of the at least one of the first and second output shafts through at least substantially all the predefined range of travel. A cover covering the cavity retains the spacer in position between the housing and the one of the first and second gears.

13 Claims, 7 Drawing Sheets

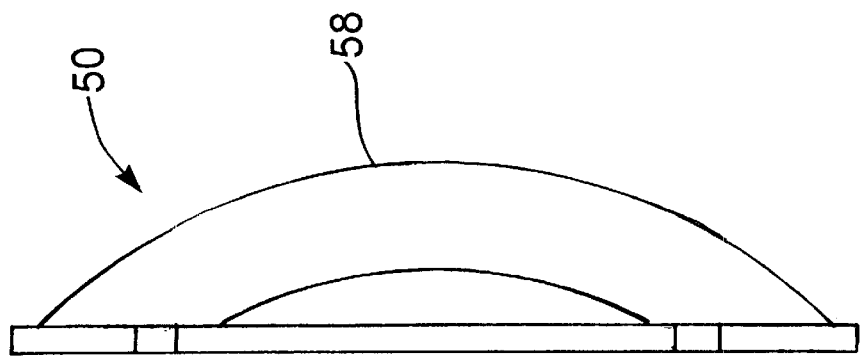
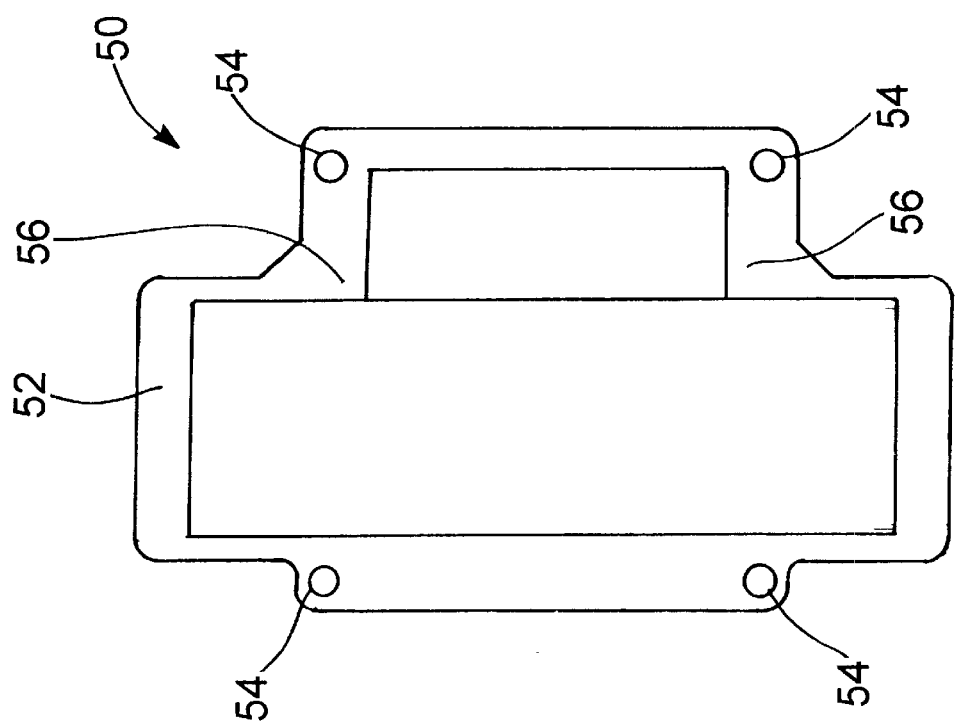

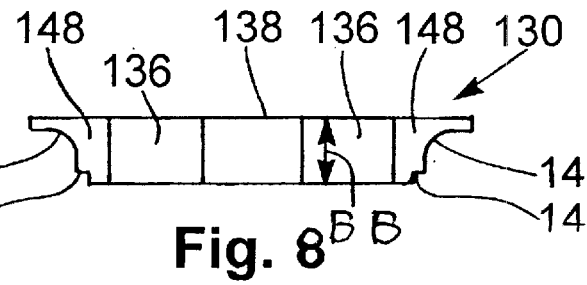
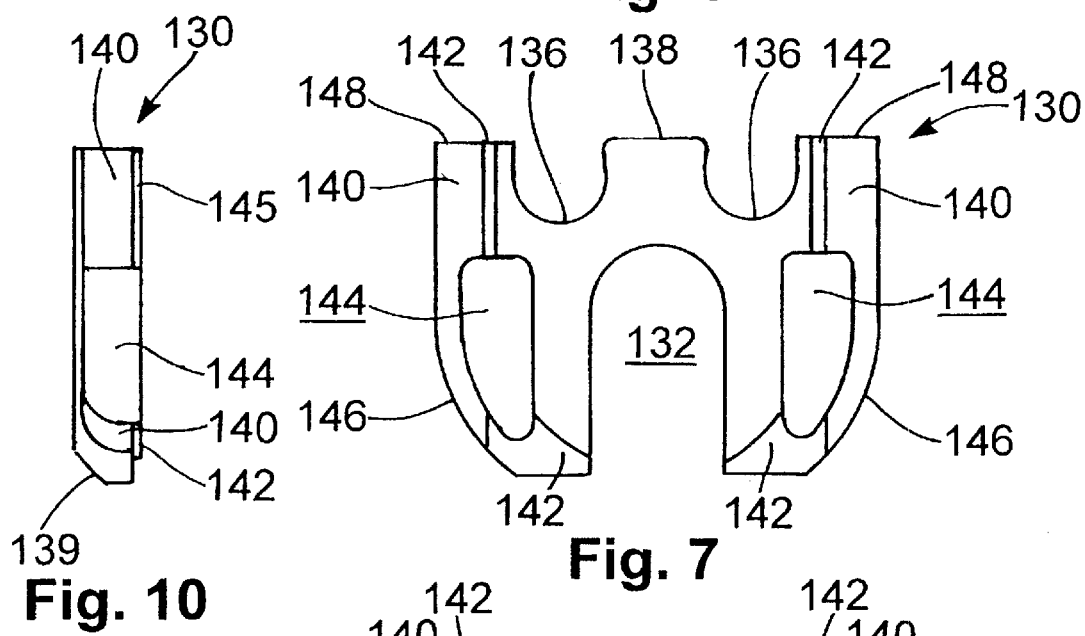
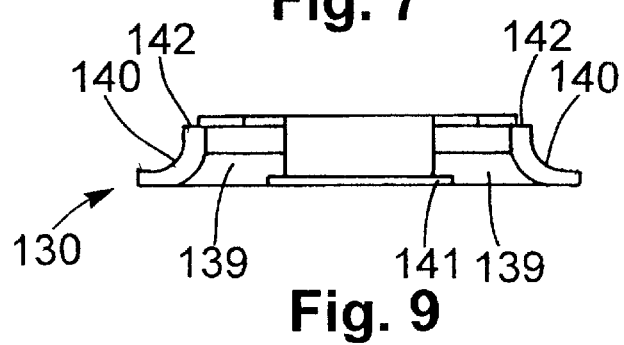

GEAR DRIVE SYSTEM HAVING SLIP-IN SPACER AND METHOD OF USE

BACKGROUND OF THE INVENTION

The present invention relates in general to gear assemblies and in particular to a spacer for facilitating assembly of such gear assemblies, including the method of using the spacer.

Gear drive systems relevant to the present invention typically are used in motorized vehicles, such as automobiles or golf carts, which have left-side and right-side driving wheels. In such applications, the gear drive system is positioned within a housing and receives power from a motor or other power source via an input shaft. The input shaft transfers that power via output shaft(s) to each of the left- and right-side driving wheels. One example of such gear drive systems is a differential gear assembly used in a transaxle of, for instance, a golf cart. The differential gear assembly divides power between the left- and right-side driving wheels and permits these two wheels to rotate at different speeds when the vehicle turns.

Differential gear assemblies generally are complex structures having many interrelated parts that must be assembled within one or more housings. Thus, assembling and disassembling these structures can be time consuming and, when assembled in mass-production fashion, even incremental increases in time-efficiency can provide significant benefit. One of the difficulties encountered in assembling single-piece housing differential gear assemblies is fixing the opposing output shafts axially with respect to one another. Typically, a significant amount of movement along the longitudinal axis of at least one of the output shafts is required to permit installation and proper positioning of the gears (and in some instances, rotating internal housings) relative to the outer housing of the differential gear assembly. This axial movement must be eliminated by fixing the output shafts in the longitudinal direction relative to one another. In prior art differential gear assemblies, such fixing has been accomplished by installing a multi-piece spacer, usually a two-piece collar, around at least one of the output shafts, thereby occupying any space that would permit axial movement of the output shaft. The difficulty with such multi-piece locking assemblies is that they are cumbersome to install and remove, slowing the assembly and disassembly processes and increasing per-unit cost for differential gear assemblies. Similarly, disassembly and reassembly for repair is cumbersome increasing the cost of repairing such differential gear assemblies.

Other types of gear drive systems of relevance include non-differential gear assemblies situated within a housing. An example of one such non-differential gear assembly is a transaxle having a "straight" or single axle that extends between a pair of opposed driving wheels wherein a drive gear is non-rotatably fixed to the single axle by a retainer, usually a key/keyway feature. Again, assembly may require that the drive gear or axle or the entire assembly including the drive gear and axle be slidable in one direction or the other (longitudinally with respect to the axle) to facilitate installation of, for example, a key within the keyway. As discussed above, longitudinal movement of this nature must be at least substantially eliminated in the assembled gear drive system to provide proper alignment and functioning. A spacer is used to eliminate such movement. As discussed above, prior art spacers have consisted of those that are multi-piece, surround the shaft, and require a fastener such as a bolt to be installed to retain the pieces of the spacer on the shaft. The prior art spacers as applied to these types of gear drive systems present the same difficulties discussed above concerning differential gear drive systems.

The present invention overcomes the difficulties presented by prior art multi-piece spacers by providing a single-piece spacer that is simply slipped into place and which is retained without the need to install fasteners into the spacer.

It should be understood that the present invention is intended to have application in all such differential and non-differential gear drive systems that are positioned within housings wherein a spacer is required to limit movement in a longitudinal direction of the housing and output shaft(s) after assembly of the gear drive system.

BRIEF SUMMARY OF THE INVENTION

Briefly stated, the present invention includes a differential including a housing having a cavity, a service port in communication with the cavity, and a pair of opposed, axially aligned apertures in communication with the cavity. Each of the apertures is aligned along a longitudinal axis of the housing. A first output shaft is positioned in one of the apertures and is at least substantially aligned with the longitudinal axis. The first output shaft includes a first inboard end within the cavity. A second output shaft is positioned in the other of the apertures and is at least substantially aligned with the longitudinal axis. The second output shaft has a second inboard end within the cavity. A first gear is positioned on the inboard end of the first output shaft. A second gear is positioned on the inboard end of the second output shaft. At least one of the first and second gears has a predefined range of travel in the direction of the longitudinal axis of the housing. A gear assembly within the cavity is in operative engagement with the first and second gears and transfers power to the first and second output shafts via the first and second gears. A spacer is positioned proximate the service port between the housing and one of the first and second gears. The spacer is configured to preclude movement of the at least one of the first and second gears through at least substantially all the predefined range of travel. A cover covers at least a portion of the service port. The cover has an inner surface, the inner surface being proximate the spacer and retaining the spacer in position between the housing and the one of the first and second gears.

In another aspect, the invention includes a method of assembling a differential including positioning a first output shaft in a first aperture in a housing, the first aperture being in communication with a cavity within the housing. A first gear is positioned on an inboard end of the first output shaft, the first gear being within the cavity. A gear assembly is positioned in the cavity of the housing, the gear assembly being operatively engaged with the first gear. A second output shaft is positioned in a second aperture in the housing, the second aperture is at least substantially aligned with, and opposed to, the first aperture. The second aperture is in communication with the cavity. A second gear is positioned on an inboard end of a second output shaft, within the cavity. The gear assembly is operatively engaged with the second gear. A spacer is positioned within the cavity and the spacer is positioned between one of the first and second gears and the housing. A cover is positioned over at least a portion of a service port of the housing. The service port is in communication with the cavity. The cover includes a land which is proximate the spacer and retains the spacer in position between the housing and the one of the first and second gears.

In yet another aspect, the invention includes a gear drive assembly having a housing with a cavity therein, a service port in communication with the cavity, and a pair of opposed, axially aligned apertures in communication with the cavity. Each of the apertures is aligned along a longitudinal axis of the housing. An output shaft is positioned within the apertures and is at least substantially aligned with the longitudinal axis. A drive gear is fixedly positioned on the output shaft. The drive gear is within the cavity. The output shaft has a predefined range of accessible travel in the direction of the longitudinal axis. A retainer fixedly secures the drive gear to the output shaft. A spacer is positioned proximate the service port and between the housing and the drive gear. The spacer is configured to preclude movement of the output shaft through at least substantially all the predefined range of accessible travel. A cover covers at least a portion of the service port. The cover includes a land proximate the spacer and which retains the spacer in position between the housing and the drive gear.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 5 is a bottom plan view of a cover for the transaxle housing shown in FIG. 1;

FIG. 6 is a side elevation view of the cover shown in FIG. 5;

FIG. 7 is a front elevational view of a first alternative embodiment of the spacer;

FIG. 8 is a top plan view of the spacer shown in FIG. 7;

FIG. 9 is a bottom plan view of the spacer shown in FIG. 7;

FIG. 10 is a left side (with reference to the view of FIG. 7) elevational view of the spacer shown in FIG. 7;

DETAILED DESCRIPTION OF THE INVENTION

Figure 1:
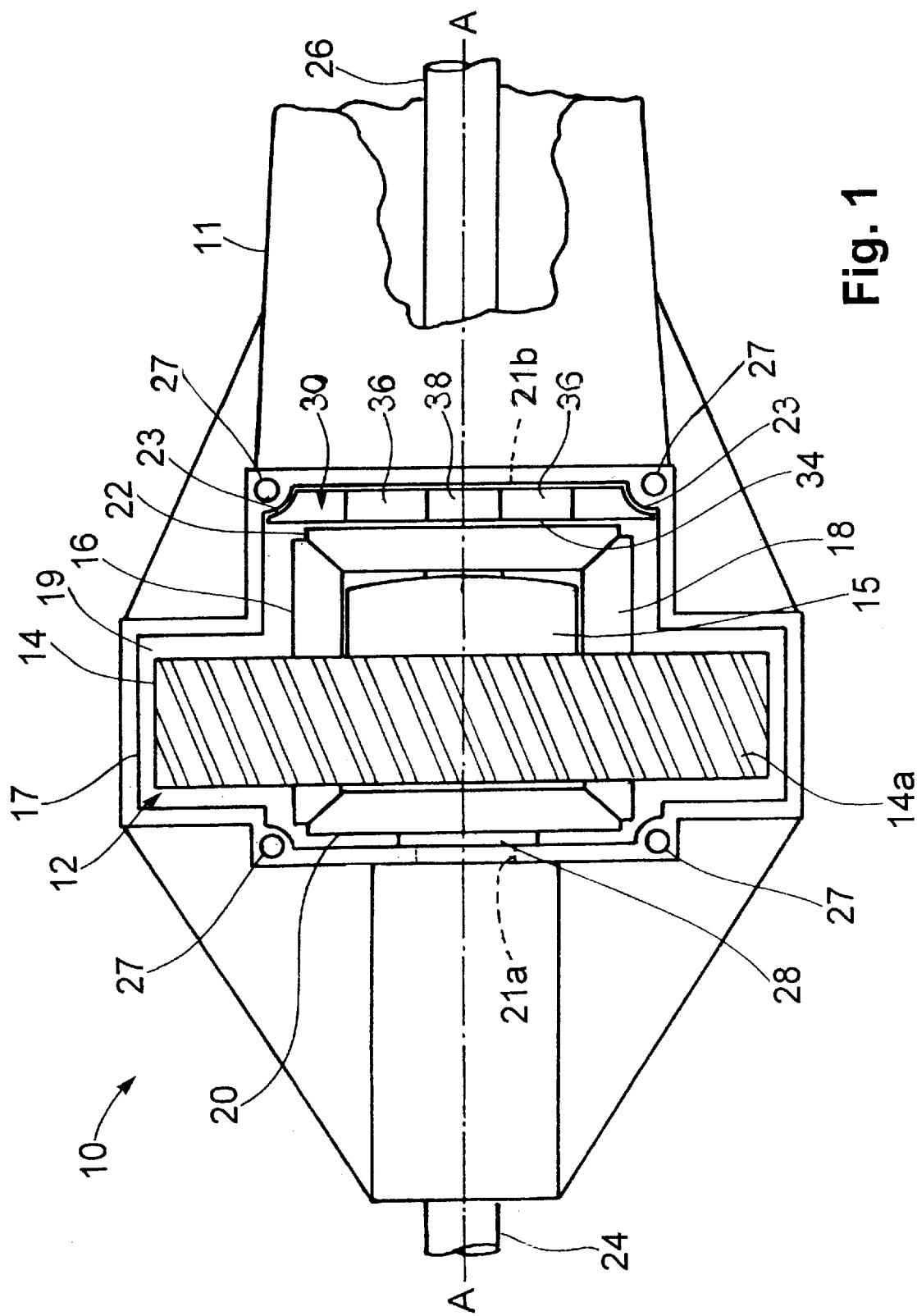
FIG. 1 is a partial, top plan view of a transaxle, partly broken away, showing an exemplary differential gear assembly and spacer in accordance with a preferred embodiment of the present invention.

Referring to FIG. 1, there is shown a differential gear drive system, generally designated 10, having a housing 11 and a differential gear assembly 12 situated within the housing 11. The differential gear assembly 12 is of a type well known to those skilled in the art and is intended herein to be illustrative and is not intended to limit the present invention solely to differential gear drive systems or to precisely the type of differential gear drive system shown.

The differential gear assembly 12 resides within a housing 11, and in particular within a cavity 19 within the housing 11. The housing 11 includes a service port 17 in communication with the cavity 19 to provide access to the cavity 19, thereby facilitating assembly of the transaxle 10, as described in detail below.

The differential gear assembly 12 preferably includes an input shaft/gear (not shown) drivingly engaged with a primary helical gear 14 which rotates about an axis A—A passing longitudinally through the housing 11. The primary helical gear 14 includes a plurality of helical gear teeth 14a, a central support structure 15, preferably unitary with the primary helical gear 14, and through which is a central bore (not shown), and a pair of transverse passages (not shown) which pass through the primary helical gear 14 and which receive an opposing pair of rotating, orbiting bevel gears 16, 18. The orbiting bevel gears 16, 18 rotate about axes which are perpendicular to axis A—A on mounting shaft assembles (not shown), the ends of which are slidably mounted in transverse slots (not shown) in communication with the transverse passages through the primary helical gear 14. Thus, the orbiting bevel gears 16, 18 rotate about their individual axes, while rotating about axis A—A, and are slidable transversely in the direction of axis A—A.

The orbiting bevel gears 16, 18 are drivingly engaged to first and second bevel gears 20, 22. The first and second bevel gears 20, 22 preferably are non-rotatingly and removably fixed to the inboard end of each of first and second output shafts 24, 26, respectively. It should be noted that the inboard ends of the first and second output shafts 24, 26 are, upon assembly of the differential gear drive system 10, positioned within the cavity 19. Thus, the first and second bevel gears 20, 22 are located within the cavity 19, and are in operative engagement with the differential gear assembly 12, the gear assembly 12 transferring power to the first and second output shafts 24, 26 via the first and second bevel gears 20, 22.

To accommodate the first and second output shafts 24, 26, the housing 11 includes a pair of opposed, axially aligned apertures 21a, b in communication with the cavity 19. The first output shaft 24 is positioned in a first aperture 21a, whereas the second output shaft 26 is positioned in a second aperture 21b. The first and second output shafts 24, 26 preferably are at least substantially aligned along their longitudinal axes. In other words, their alignment is preferably parallel and co-axial along the longitudinal axes, but may vary somewhat to accommodate design changes that, for example, may be required for particular applications.

The first and second bevel gears 20, 22, are non-rotatingly and removably fixedly to the first and second output shafts 24, 26 by a locator cross pin (not shown) which passes slidably and transversely through the first output shaft 24 adjacent to the inboard end of the first output shaft 24 and through the second output shaft 26 at a point preferably spaced from the inboard end of the second output shaft 26 (for reasons that will become apparent below). The locator cross pins are received by a slot (not shown) in an outboard side of each of the first and second bevel gears 20, 22, thus preventing rotation of the first and second bevel gears 20, 22 relative to the first and second output shafts 24, 26, respectively. It will be understood by those skilled in the art that the first and second bevel gears 20, 22 may be rotationally fixed to the first and second output shafts 24, 26, and yet removable therefrom, by any of a number of well-known devices, such as by keyways, pins, mating threads, etc. Additionally, depending on the nature of the housing 11 used, i.e., whether the housing 11 is split longitudinally (not shown), the first and second bevel gears 20, 22 may be permanently fixed to the first and second output shafts 24, 26 without departing from the scope and spirit of the invention.

Each of the first and second output shafts, 24, 26 preferably is slidably (in the direction of longitudinal axis A—A) and rotatably mounted in the housing 11, primarily to permit assembly of the above-described differential gear assembly 12, as will be discussed in detail below. As will be recognized by those skilled in the art, the locator cross pin which passes through the second output shaft 26 is spaced from the inboard end of the shaft 26 to permit the second output shaft 26 to extend through a central passage (not shown) through the primary helical gear 14, which is rotatably mounted on, and supported in part by, the inboard end of the second output shaft 26. Therefore, given the nature of the housing 11 as unitary, i.e., not being separable into discrete sections along a plane perpendicular to axis A—A, at least one of the first and second output shafts 24, 26, and accordingly, the first and second bevel gears 20, 22, preferably are slidably movable within the housing 11 in the direction of axis A—A (and in the direction of the longitudinal axes of the first and second output shafts 24, 26). Alternatively to the above-described configuration, it is also contemplated that only one of the first and second output shafts 24, 26 be slidably movable in the direction of axis A—A, and that the slidable output shaft may be either the first or the second output shaft 24, 26. Those skilled in the art will recognize that changes of this nature to the above-described structure are primarily determined by the nature of the housing 11 employed (i.e., whether the housing 11 is a unitary or separable structure and how the components within the housing 11 are installed) and the nature of the gears used in the transaxle 10. It will be recognized that changes of this nature are well within the capabilities of one skilled in the art.

Preferably, the primary helical gear 14, orbiting bevel gears 16, 18, first and second bevel gears 20, 22, and first and second output shafts 24, 26 are made from metallic materials, most preferably steel. However, it is contemplated that these components may also be constructed of polymeric material or other high-strength, durable material without departing from the spirit and scope of the invention.

As those skilled in the art will recognize, proper alignment (along axis A—A) and engagement of the bevel gears 16, 18, 20, 22 is required for efficient operation and longevity of the differential gear drive system 10. In that vein, proper spacing of the first and second bevel gears 20, 22 with respect to one another is essential. The first bevel gear 20 is properly positioned along axis A—A on its outboard side by a first circumferential bearing or washer 28 which is positioned on the first output shaft 24 between the housing 11 and the outboard side of the first rotating bevel gear 20. On its inboard side, the first bevel gear 20 is properly positioned by its engagement with the orbiting bevel gears 16, 18. Thus, the axial movement of the first bevel gear 20 in the direction of axis A—A is constrained on one side by the first spacing washer 28 and on its opposite side by the orbiting bevel gears 16, 18.

The orbiting bevel gears 16, 18, and accordingly the primary helical gear 14, are properly axially positioned along axis A—A by engagement of the orbiting bevel gears 16, 18 with the first and second bevel gears 20, 22. Accordingly, in the preferred configuration described herein, proper positioning of the second bevel gear 22 along axis A—A is essential to the proper alignment and engagement of the remainder of the gear assembly 12. Recall, however, that as stated above, in alternative embodiments, either or both of the first and second output shafts 24, 26 (and accordingly, first and second bevel gears 20, 22) may be slidable in the direction of axis A—A to facilitate assembly and therefore, depending on whether an alternative embodiment is employed, proper positioning of the orbiting bevel gears 16, 18 and primary helical gear 14 may be determined by either or both of the first and second bevel gears 20, 22.

Referring again to FIG. 1, the position of the second bevel gear 22 along the longitudinal axis A—A is maintained on its inboard side by engagement with the orbiting bevel gears 16, 18 which themselves are positioned by engagement with the first rotating bevel gear 20. The advance of the present invention is related to the apparatus for maintaining positioning of the orbiting bevel gears 16, 18 and primary helical gear 14 through proper positioning of one of the first and second bevel gears 20, 22, and most preferably the second bevel gear 22. Such positioning preferably is obtained from affecting positioning of the second bevel gear 22 from the outboard direction, i e., between the second bevel gear 22 and the housing 11. It is well known to those skilled in the art that, given the configuration of the housing 11 of the preferred embodiment, at least one of the first and second bevel gears 20, 22, and most preferably the second bevel gear 22, must have significant axial movement (in the longitudinal direction A—A) to permit assembly of the differential gear assembly 12, as will be discussed in more detail below. This longitudinal movement of the second bevel gear 22 permits the first bevel gear 20 and the gear assembly 12 consisting of the primary helical gear 14 and the orbiting bevel gears 16, 18 to be positioned within the housing 11 during assembly without the need to have a break (not shown) through the entire housing 11 in a plane perpendicular to the axis A—A that would permit splitting of the housing 11 (commonly referred to as a "clamshell housing"). In other words, the axial movement of the second rotating bevel gear 22 and the second output shaft 26 is achieved not through splitting the housing 11 as described above, but rather by designing the cavity 19 of the housing 11 with sufficient space to permit axial movement of, preferably, the second bevel gear 22 to allow insertion of the locator cross pin which engages the outboard side of the bevel gear 22. The additional space within the housing 11 is shown in FIG. 1 as being occupied by a preferred embodiment of a slip-in spacer 30. Preferably, the spacer 30 is constructed of aluminum, but it is contemplated that the spacer 30 could be made from any material, such as a polymeric material, that maintains its shape under a variety of operating conditions.

The spacer 30 of the preferred embodiment, best shown in FIGS. 1–4, is positioned proximate the service port 17, between the outboard side of the second bevel gear 22 and the housing 11 as shown in FIG. 1, such that the second output shaft 26 passes through the spacer 30. Again note that the spacer 30 may be employed to properly space either or both of the first and second bevel gears 20, 22 from the housing 11 to achieve proper alignment of the various components of the transaxle 10. The outboard side (shown in FIG. 2) of the spacer 30 engages the housing 11 and is preferably spaced from the outboard side of the second bevel gear 22 by a second circumferential bearing or washer 34 which, as will be recognized by those skilled in the art, provides a bearing surface against which the second bevel gear 22 rotates, thus reducing wear of the second bevel gear 22 and the spacer 30. As will further be recognized by those skilled in the art upon reading this disclosure, the second rotating bevel gear 22 is held in mating engagement with the orbiting bevel gears 16, 18 by engagement between the outboard side of the second bevel gear 22 and the second washer 34, the second washer 34 and the spacer 30, and the spacer 30 and the housing 11. The spacer 30 is thus configured and functions to preclude movement of the second output shaft 26 and second bevel gear 22 through at least substantially all the predefined range of travel in the direction of axis A—A and the longitudinal axes of the first and second output shafts 24, 26. In other words, the spacer 30 takes up most if not all of the movement of the first and/or second output shafts 24, 26 that is designed to facilitate assembly of the transaxle 10. To this end, the spacer 30 preferably has a thickness (in the direction of axis A—A) approximately equal to the predefined range of travel.

The spacer 30 of the preferred embodiment preferably includes a slot 32, the second output shaft 26 preferably passing through the spacer 30 via the slot 32. As will be recognized by those skilled in the art from reading this disclosure, using a slot 32 rather than a hole for passing the second output shaft 26 through the spacer 30 permits the spacer 30 to be slipped into the housing 11 between the second washer 34 and the housing 11, thus facilitating rapid assembly of the transaxle 10. The spacer 30 is further provided with a pair of recesses 36 which define a finger grip 38 to facilitate installation and removal of the spacer 30 from the housing 11 during assembly/disassembly and repair. The spacer 30 preferably includes a pair of legs 44 which define the slot 32. Additionally, the spacer 30 is provided with a pair of inclined surfaces 43 along the lead edges of the legs 44 sloping inwardly from the outboard surfaces of the legs 44 toward the slot 32 to facilitate placing the spacer 30 between the second washer 34 and the housing 11. The gear-side (shown in FIG. 4) of the spacer 30 preferably is provided with a recess 41 along the periphery of the slot 32 to accommodate the second circumferential bearing or washer 34. The recess 41 is not critical to the proper functioning of the spacer 30 inasmuch as the second washer 34 may seat directly against the inboard side of the spacer 30, or, depending on the material from which the spacer 30 is made, may be integral with the spacer 30 without departing from the spirit and scope of the invention. It should be noted that the recess 41, in addition to other external features of the spacer 30, assists in properly orienting the spacer 30 within the housing 11.

Figure 3:
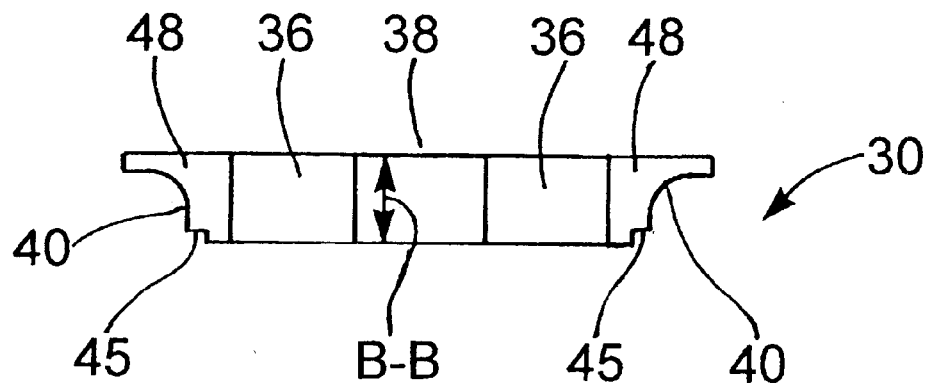
FIG. 3 is a top plan view of the spacer shown in FIG. 1.
Figure 2:
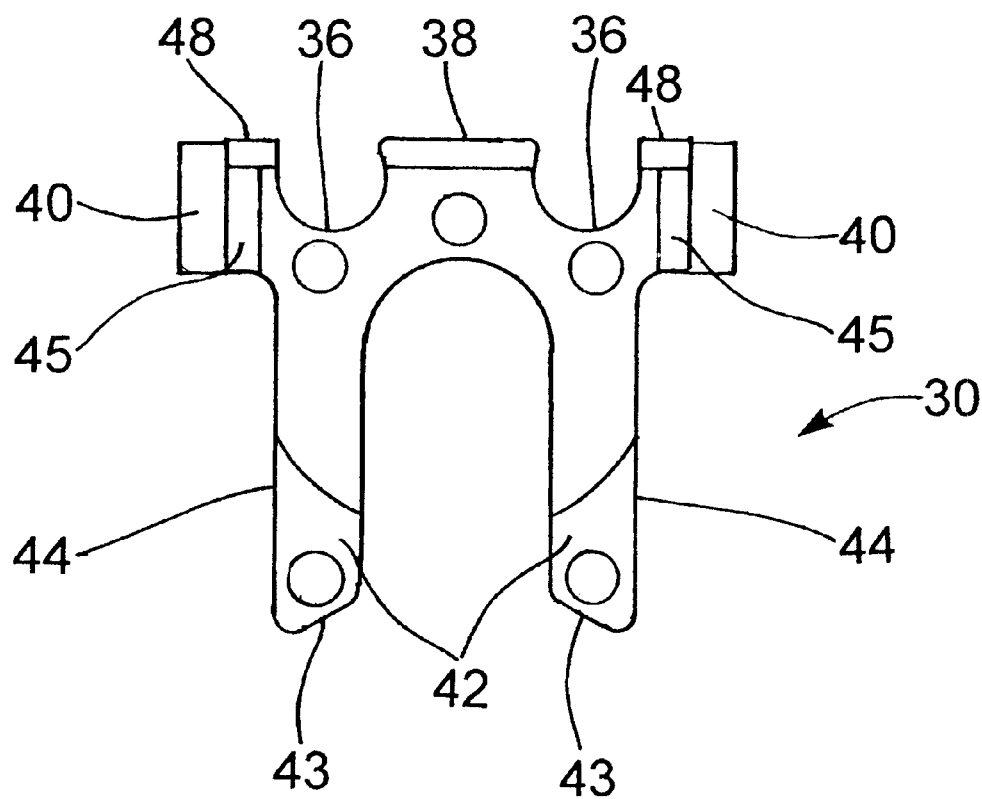
FIG. 2 is a front elevational view of the spacer shown in FIG. 1.
Figure 4:
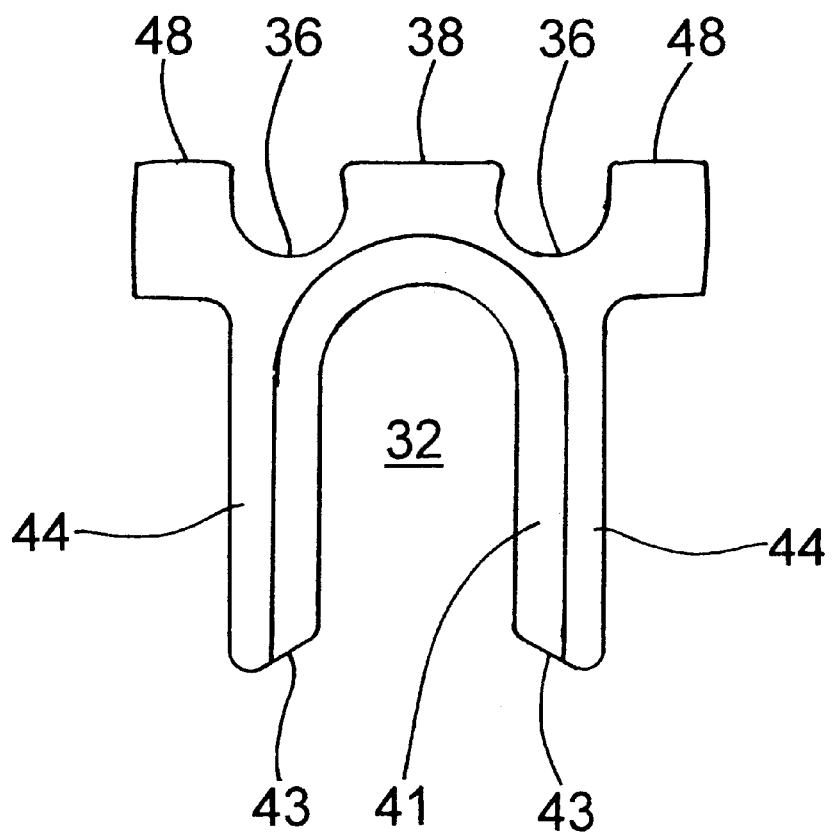
FIG. 4 is a rear elevational view of the spacer shown in FIG. 1.
Figure 11:
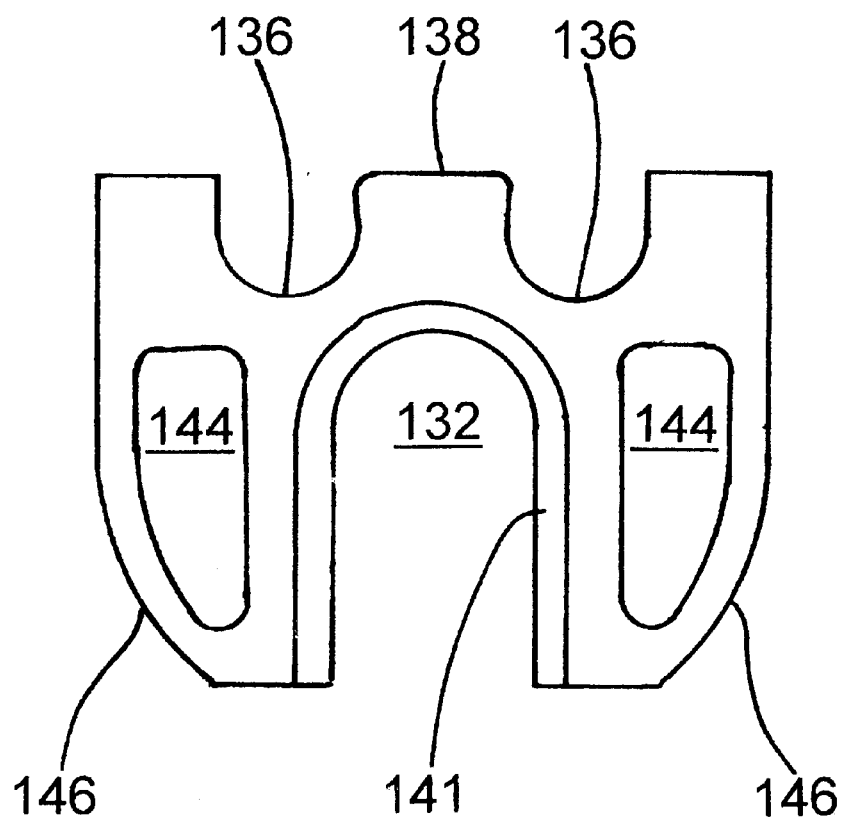
FIG. 11 is a rear elevational view of the spacer shown in FIG. 7.

Referring to FIGS. 2–4, the spacer 30 preferably is provided with features to accommodate corresponding features within the interior of the housing 11. These features include a pair of fillets 40 on each lateral side of the spacer 30 to accommodate screw bosses 23 within the cavity 19 of the housing 11. Additionally, the spacer 30 preferably includes first and second rabbets 42, 45 to prevent interference between any imperfections in the inner corners of the casting of the housing 11 and the spacer 30. It should be noted that the configuration of outer surfaces of the spacer 30 may play an important role in preventing the spacer from spinning freely in the housing 11 and also preventing the improper positioning of spacer 34 in the housing 11.

In prior art configurations (not shown), proper positioning along the A—A axis was obtained through the use of a split spacer (not shown) which required one to fasten two segments together such that they would be retained in a position to maintain the proper positioning of the first and second output shafts 24, 26. By contrast, the spacer 30 is retained within the housing 11 by contact preferably between the contact surfaces 48 of the spacer 30 and a cover 50, shown in FIGS. 7 and 8. The cover 50 is fixed to the housing 11 over the service port 17 of the housing 11, thereby sealing the cavity 19, thus protecting the gear assembly 12 and retaining the spacer 30. The cover 50 preferably includes a mounting flange 52 which engages the housing 11. A plurality of non-threaded holes 54 in the mounting flange 52 correspond with a plurality of threaded holes 27 in the housing 11 such that the cover 50 may be secured to the housing 11 by a plurality of fasteners (not shown). Alternatively, the cover 50 could be fastened to the housing 11 by any of a number of alternative ways known to those skilled in the art such as by clamping, use of adhesives, welding, etc. The cover 50 retains the spacer 30 within the housing 11 by proximity between a pair of contact surfaces 48 on the spacer 30 and a corresponding pair of lands 56 on the cover 50. It will be recognized by those skilled in the art that in the preferred embodiment, the lands 56 and contact surfaces 48 need only be proximate to one another, and that the lands 56 and contact surfaces 48 need not always be in contact, so long as the spacer 30 is restrained from moving out of position. Thus, when the cover 50 is fixed to the housing 11, the spacer 30 is retained in position and obviates the need to use a two-piece spacer (not shown) as was used in the prior art. Preferably, the cover 50 is also provided with a raised profile 58 to accommodate the outer profile of the differential gear assembly 12.

In a first alternative embodiment, a spacer 130, best shown in FIGS. 7–11, is likewise positioned between the outboard side of, preferably, the second rotating bevel gear 22 and the housing 11 as shown in FIG. 1, such that the second output shaft 26 passes through the slot 132 of the spacer 130. The spacer 130 is further provided with a pair of recesses 136 which define a finger grip 138 to facilitate installation and removal of the spacer 130 from the housing 11 during assembly/disassembly and repair. Additionally, the spacer 130 is provided with a radiused profile 139 along its lead edge to facilitate placing the spacer 130 between the second washer 34 and the housing 11 in the preferred embodiment. The gear-side (shown in FIG. 11) of the spacer 130 preferably is provided with a recess 141 along the periphery of the slot 132 to accommodate the second cylindrical bearing or washer 34. Preferably, the spacer 130 is further provided features to accommodate corresponding features within the interior of the housing 11. These features include a fillet 140 on each lateral side of the spacer 130 to accommodate screw bosses 23 within the housing 11. Additionally, the spacer 130 preferably includes first and second rabbets 142, 145 to prevent interference between any imperfections in the inner corners of the casting of the housing 11 and the spacer 30. To reduce the weight of the spacer 130, lightening holes 144 are preferably incorporated therein. Further, the outer periphery of the lead edge of the spacer 130 preferably is provided with a curvature 146 to accommodate the curvature of the inner surface of the housing 11. It should be noted that the outer surfaces of the spacer 130 are configured to play an important role in preventing the spacer from spinning freely in the housing 11 and also preventing the improper positioning of spacer 34 in the housing 11. The spacer 130 is, like the spacer 30 of the first preferred embodiment, retained within the housing 11 by its proximity to the cover 50, and more specifically, by the proximity between the contact surfaces 148 of the spacer 130 and the lands 56 of the cover 50, shown in FIGS. 7 and 8.

In a second alternative embodiment (not shown), the spacer 30 is retained within the housing 11 by a snap-type engagement between the spacer 30 and the housing 11 and by the cover-retention relationship discussed in the previous paragraph. In a third alternative embodiment (not shown), the spacer 30 is retained within the housing 11 by a snap-fit engagement with the second output shaft 26 and by the cover 50. As will be understood by those skilled in the art, the spacer 30 of the second alternative embodiment would preferably be constructed from a material which is moderately yieldable such that a protuberance (not shown) on the spacer 30 yields as it snaps into engagement with a receiving feature (not shown) on the housing 11. As will be understood by those skilled in the art, the spacer 30 of the third alternative embodiment also is preferably made from a moderately yieldable material such that the slot 32 may be enlarged slightly as one or more protuberances (not shown) on the inwardly-opposed surfaces of the slot 32 (which engage the second output shaft 26) pass over the second output shaft 26 during installation or removal of the spacer 30 from within the housing 11. Most preferably, the second and third alternative embodiments of the spacer 30 are made from PTFE, although other polymeric materials may be used. In addition, the spacer 30 could be designed as an integral part of the cover 50.

The differential gear drive system 10 is assembled within the housing 11 as follows, with reference primarily to FIG. 1. The input shaft/gear assembly (not shown) is positioned within the housing 11. The first output shaft 24 is positioned within the housing 11, the first cylindrical bearing or washer 28 is positioned on the first output shaft 24 and the locator cross pin is inserted through the hole in the inboard end of the first output shaft 24. The first rotatable bevel gear 20 is positioned on the inboard end of the first output shaft 24 such that the locator cross pin is received by the slot in the outboard or housing side of the first bevel gear 20. The first bevel gear 20 and first cylindrical bearing or washer 28 are moved into a position adjacent to the housing 11. The mounting shaft assembly is passed through each orbiting bevel gear 16, 18, and each mounting shaft assembly/bevel gear 16, 18 is positioned within a transverse passage through the primary helical gear 14. The assembly including the primary helical gear 14 engages the input shaft/gear assembly and the orbiting bevel gears 16, 18 is positioned within the housing 11 such that the primary helical gear 14 and the orbiting bevel gears 16, 18 engage the first rotating bevel gear 20.

The second output shaft 26 is inserted into the housing 11 from the outboard side of the housing 11 such that the inboard end of the second output shaft 26 emerges slightly into the interior of the housing 11. The second cylindrical bearing or washer 34 is positioned on the second output shaft 26, followed by the second bevel gear 22. The second output shaft 26 is further inserted into the housing 11 such that the inboard end of the second output shaft 26 enters the central bore of the central support 15 of the primary helical gear 14. As the second output shaft 26 further enters the central bore of the primary helical gear 14, it becomes possible to insert the locator cross pin for the second rotatable bevel gear 22 into the hole through the second output shaft 26. Accordingly, the locator cross pin is inserted through the second output shaft 26 and the second output shaft 26 is slidably positioned fully into the housing 11 such that the locator cross pin is received in the slot in the outboard or housing side of the second bevel gear 22 and the second bevel gear 22 engages the orbiting bevel gears 16, 18. It should be noted that, as recognized by those skilled in the art, the sequence of the above events may be varied, depending upon several factors including the type of gears used, the configuration of the particular housing, and which of the first and second output shafts 24, 26 (or both shafts) are slidable along axis A—A to accommodate assembly space requirements.

The spacer 30 preferably is grasped by the finger grip 38 and placed into position within the housing 11, over the second output shaft 26 such that the second output shaft 26 is positioned within the slot 32. The spacer 30 is positioned between the housing 11 and the second cylindrical bearing or washer 34. Finally, the cover 50 is positioned over the opening in the housing 11 such that the contact surfaces 48 are proximate the lands 56, whereupon the fasteners (not shown) are passed through the non-threaded holes 54 and threaded into the threaded holes 27. It is also preferred that a gasket material (not shown) such as a silicone-based sealer or a rubber or fiber gasket is positioned between the cover 50 and the housing 11 to prevent leakage of lubricants out of the housing 11 or leakage of contaminants into the housing 11.

It should be noted that the above-described differential configuration is intended merely as exemplary and is not intended to be limiting. The above-described spacer 30, 130 and cover 50 for retaining the spacer 30, 130 is intended to have applicability in any gear drive system wherein the output shaft(s) must be fixed in position relative to a stationary surface within the cavity to complete assembly of the gear drive system.

Figure 12:
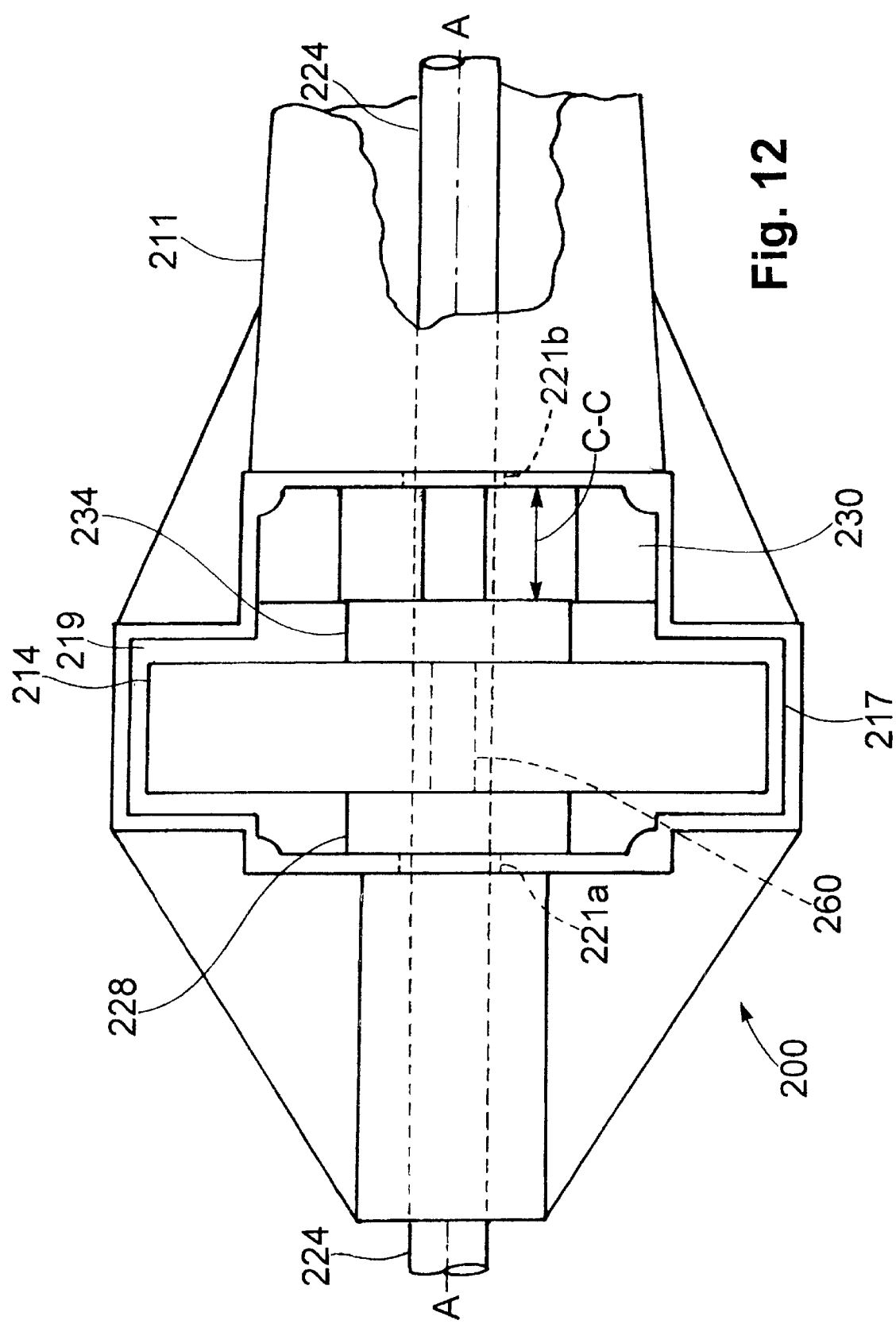
FIG. 12 is a partial, top plan view of a transaxle, partly broken away, showing an exemplary non-differential gear assembly and spacer in accordance with a further preferred embodiment of the present invention.

In a further embodiment of the present invention shown in FIG. 12, there is shown a non-differential gear drive system 200. For purposes of brevity, features shown in FIG. 12 that are common to FIG. 1 and are not necessary to the description of the present embodiment will not be described again. Those features of FIG. 1 that are necessary to a description of the embodiment shown in FIG. 12 will be given like reference numbers to corresponding features in FIG. 1, but with a 200 designation. The housing 211 includes a cavity 219, a service port 217 in communication with the cavity 219, and a pair of opposed, axially aligned apertures 221a, b in communication with the cavity 219. A single output shaft 224 is positioned within the apertures 221a, b. The output shaft 224 is at least substantially aligned with the longitudinal axis A—A of the housing 211. A single drive gear 214 is fixedly positioned on the output shaft 224 such that the drive gear 214 is positioned within the cavity 219. A retainer 260, such as a key and keyway, is positioned on the output shaft 224 and drive gear 214, functioning to fixedly position the drive gear 214 on the output shaft 224. It is contemplated that other retainers (not shown) well known to those skilled in the art may be used to fix the drive gear 214 to the output shaft 224 without departing from the spirit and scope of the invention. To install the retainer 260 onto the drive gear 214 and output shaft 224 (described more fully below), the cavity 219 is provided with space sufficient to permit the retainer 260 to be inserted prior to properly positioning the drive gear 214 with respect to the output shaft 224 in the section of the longitudinal axis A—A, as will be described more fully below.

Preferably, the non-differential gear drive system 200 further includes first and second circumferential bearings or washers 228, 234 adjacent to first and second sides of the drive gear 214. A third alternative embodiment of the spacer 230 is positioned proximate the service port 217, between the housing 211 and the drive gear 214, and more preferably between the housing 211 and the second circumferential bearing or washer 234. Preferably, the spacer 230 has the same features as shown in FIGS. 2–4, but as shown in FIG. 12 has a thickness C—C in the direction of the longitudinal axis A—A which preferably is greater than the thickness B—B of the first and second preferred embodiments shown in FIGS. 3 and 8. Alternatively, as a fourth alternative embodiment, the spacer 230 may be configured with the features shown in FIGS. 7 11, again preferably with a thickness C—C as shown in FIG. 12. As was described above with respect to the spacers 30, 130 as applied to a differential gear drive system, the spacer 230 is configured to preclude movement of the output shaft 224. In the present non-differential gear drive system 200, the spacer 230 acts to preclude movement of the output shaft 224 through at least substantially all of a predefined range of accessible travel. The range of accessible travel is defined to mean approximately the distance along the longitudinal axis A—A which is required to facilitate installation of the retainer 260. In FIG. 12, the predefined range of accessible travel is shown as being equal to the thickness C—C of the spacer 230. As will be recognized by those skilled in the art having read this disclosure, the cavity 219 must be configured to accommodate the predefined range of accessible travel of the output shaft 224.

Referring to FIGS. 5 and 6, a cover 50, as described above with regard to the differential gear drive system 10, is positioned over at least a portion of the service port 217 in the manner described above. The cover 50 includes a land 56 proximate the spacer 230 and retains the spacer 230 in position between the housing 211 and the drive gear 214.

The non-differential gear drive system 200 is assembled as follows. The drive gear 214 is inserted into the cavity 219 of the housing 211. The output shaft 224 is inserted into the housing 211 through one of the first and second apertures 221a, b, then through the other. As the output shaft 224 is slidably moved through the cavity 219, it is likewise inserted through a passage (not shown) in the first circumferential bearing or washer 228, through a passage (not shown) in the drive gear 214, and through a passage (not shown) in the second circumferential bearing or washer 234. Once the output shaft 224 is positioned in the housing 211, the second circumferential bearing or washer 234 is positioned adjacent the housing 211, distanced from the drive gear 214 by a distance approximately equal to the predefined range of travel, and the retainer 260 is positioned on the output shaft 224. The output shaft 224 is moved a distance approximately equal to the predefined range of accessible travel into place relative to the drive gear 214 such that the retainer 260 fixedly engages the drive gear 214 to the output shaft 224. For example, when the retainer 260 is a key/keyway, the output shaft 224 is preferably pressed into place with respect to the drive gear 214 with a hydraulic press. Those skilled in the art will recognize that the retainer 260 may include any number of commonly used mechanisms to secure a shaft to a gear without departing from the scope and spirit of the invention. The second circumferential bearing or washer 234 is positioned adjacent to the drive gear 214 and the spacer 230, having a thickness C—C approximately equal to the predefined range of accessible travel, is positioned on the output shaft 224, between the housing 211 and the second circumferential bearing or washer 234. It will be recognized by those skilled in the art having read this disclosure that the first and/or second circumferential bearings or washers 228, 234 may be omitted without departing from the spirit and scope of the invention. As discussed above with regard to the differential gear system 10, regardless of whether a second circumferential bearing or washer 234 is used, the spacer 230 will occupy a longitudinally oriented space along the output shaft 224 approximately equal to the predefined range of accessible travel and will therefore provide support in the direction of longitudinal axis A—A for properly positioning the drive gear 224 along that axis with respect to the housing 211 (and input drive/gear). Having installed the spacer 230, the cover 50 is positioned over at least a portion of the service port 217 such that the land 56 is proximate the spacer 230, retaining the spacer in position between the housing 211 and the second circumferential bearing or washer 234 (or drive gear 214, if no second circumferential bearing or washer 234 is used). Those skilled in the art will recognize that the order of the above-described steps may be varied from that which is stated above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A gear drive system comprising:
    a housing having a cavity, a service port in communication with the cavity, and a pair of opposed, apertures in communication with the cavity, each of the apertures aligned along a longitudinal axis of the housing;
    a first output shaft positioned in one of the apertures and being at least substantially aligned with the longitudinal axis of the housing, the first output shaft having a first inboard end within the cavity;
    a second output shaft positioned in the other of the apertures and being at least substantially aligned with the longitudinal axis of the housing, the second output shaft having a second inboard end within the cavity;
    a first gear positioned on the inboard end of the first output shaft;
    a second gear positioned on the inboard end of the second output shaft, at least one of the first and second gears having a predefined range of travel in the direction of the longitudinal axis of the housing;
    a gear assembly within the cavity in operative engagement with the first and second gears, the gear assembly for transferring power to the first and second output shafts via the first and second gears;
    a spacer positioned proximate the service port and between the housing and one of the first and second gears, the spacer being configured to preclude movement of the at least one of the first and second gears in a direction along the longitudinal axis of the housing through at least substantially all the predefined range of travel; and
    a cover for covering at least a portion of the service port, the cover having a land, the land being proximate the spacer and retaining the spacer in position between the housing and the one of the first and second gears.

2. The gear drive system of claim 1, wherein the spacer has a thickness in a direction of the longitudinal axis, the thickness being approximately equal to the predefined range of travel to preclude movement of the at least one gear in the direction of the longitudinal axis of the housing.

3. The gear drive system of claim 1, wherein the spacer includes a contact surface positioned between the one gear and the housing, the contact surface being adjacent the land when the cover is covering thy service port.

4. The gear drive system of claim 1, further including a circumferential bearing positioned on the one of the first and second output shafts between the spacer and the one of the first and second gears.

5. The gear drive system of claim 1, wherein the housing is unitary.

6. The gear drive system of claim 1, wherein the spacer has a slot therein that extends in a direction transverse to the longitudinal axis, the one of the first and second output shafts being positioned within the slot.

7. The gear drive system of claim 6, wherein the spacer includes first and second fingers defining the slot.

8. The gear drive system of claim 7, wherein the spacer includes a pair of recesses, each recess substantially opposed to one of the first and second fingers.

9. A gear drive system comprising:
- a housing having a cavity, a service port in communication with the cavity, and a pair of opposed, apertures in communication with the cavity, each of the apertures aligned along a longitudinal axis of the housing;
- a first output shaft positioned in one of the apertures and being at least substantially aligned with the longitudinal axis of the housing, the first output shaft having a first inboard end within the cavity;
- a second output shaft positioned in the other of the apertures and being at least substantially aligned with the longitudinal axis of the housing, the second output shaft having a second inboard end within the cavity;
- a first gear positioned on the inboard end of the first output shaft;
- a second gear positioned on the inboard end of the second output shaft, at least one of the first and second gears having a predefined range of travel in the direction of the longitudinal axis of the housing;
- a gear assembly within the cavity in operative engagement with the first and second gears, the gear assembly for transferring power to the first and second output shafts via the first and second gears;
- a spacer positioned proximate the service port and between the housing and one of the first and second gears, the spacer being configured to preclude movement of the at least one of the first and second gears through at least substantially all the predefined range of travel;
- a circumferential bearing positioned on the one of the first and second output shafts between the spacer and the one of the first and second gears, the spacer including first and second fingers, the first and second fingers each including a recess for receiving the bearing; and
- a cover for covering at least a portion of the service port, the cover having a land, the land being proximate the spacer and retaining the spacer in position between the housing and the one of the first and second gears.

10. A method of assembling a gear drive system comprising the steps of:
- positioning a first output shaft in a first aperture in a housing, the first aperture being in communication with a cavity within the housing;
- positioning a first gear on an inboard end of the first output shaft, the first gear being within the cavity;
- positioning a gear assembly in the cavity of the housing, the gear assembly being operatively engaged with the first gear;
- positioning a second output shaft in a second aperture in the housing, the second aperture being at least substantially aligned with, and opposed to, the first aperture, the second aperture being in communication with the cavity;
- positioning a second gear on an inboard end of a second output shaft, the second gear being within the cavity, the gear assembly being operatively engaged with the second gear;
- slidably positioning a spacer within the cavity in a direction generally transverse to the longitudinal axis between one of the first and second gears and the housing;
- positioning a cover over at least a portion of a service port of the housing, the service port being in communication with the cavity, the cover having a land, the land being proximate the spacer and retaining the spacer in position between the housing and the one of the first and second gears.

11. The method of claim 10, wherein the step of slidably positioning the spacer within the cavity further includes orienting the spacer substantially transverse to a longitudinal axis of the housing.

12. A gear drive assembly comprising:
- an elongate housing having a cavity and a pair of opposed apertures in communication with the cavity, the apertures being aligned with a longitudinal axis of the housing;
- at least one output shaft extending through at least one of the apertures and having an inboard end located within the cavity, the output shaft being at least substantially aligned with the longitudinal axis;
- a gear fixedly connected to the inboard end of the output shaft for rotation therewith, the gear and the output shaft having a predefined range of travel in a direction of the longitudinal axis to facilitate assembly of the gear drive assembly within the elongate housing; and
- a spacer located within the cavity between the housing and the gear, the spacer being stationary with respect to the housing and comprising a pair of spaced legs with a slot therebetween for installation on the output shaft in a direction transverse to the longitudinal axis, the output shaft extending through the slot to thereby preclude movement of the gear and the output shaft through at least substantially all of the predefined range of travel.

13. A gear drive assembly according to claim 12, wherein the spacer has a thickness in a direction of the longitudinal axis, the thickness being approximately equal to the predefined range of travel.

* * * * *